(12) United States Patent
d'Abreu et al.

(10) Patent No.: US 10,635,339 B2
(45) Date of Patent: Apr. 28, 2020

(54) DEVICES, SYSTEMS, AND METHODS FOR REDUCING STORAGE UTILIZATION WITH DATA DEDUPLICATION

(71) Applicant: Smart IOPS, Inc., Milpitas, CA (US)

(72) Inventors: Manuel Antonio d'Abreu, El Dorado Hills, CA (US); Ashutosh Kumar Das, Cupertino, CA (US)

(73) Assignee: SMART IPOS, INC., Milpitas, CA (US)

( * ) Notice: Subject to any disclaimer, the term of this patent is extended or adjusted under 35 U.S.C. 154(b) by 38 days.

(21) Appl. No.: 15/969,733

(22) Filed: May 2, 2018

(65) Prior Publication Data

US 2018/0321868 A1 Nov. 8, 2018

Related U.S. Application Data

(60) Provisional application No. 62/500,231, filed on May 2, 2017.

(51) Int. Cl.
*G06F 3/06* (2006.01)

(52) U.S. Cl.
CPC .......... *G06F 3/0641* (2013.01); *G06F 3/0608* (2013.01); *G06F 3/0688* (2013.01)

(58) Field of Classification Search
CPC .... G06F 3/0608; G06F 3/0626; G06F 3/0641; G06F 3/0679; G06F 3/0688; G06F 12/0292; G06F 2212/1044

USPC .......................................... 707/692; 711/103
See application file for complete search history.

(56) References Cited

U.S. PATENT DOCUMENTS

| | | | | |
|---|---|---|---|---|
| 2013/0290277 A1* | 10/2013 | Chambliss | .......... | G06F 16/2365 707/692 |
| 2014/0143213 A1* | 5/2014 | Tal | ....................... | G06F 16/2365 707/692 |
| 2015/0154216 A1* | 6/2015 | Maybee | .............. | G06F 12/0866 707/692 |
| 2016/0063024 A1* | 3/2016 | Zheng | ................. | G06F 16/1748 707/692 |

* cited by examiner

*Primary Examiner* — Gary J Portka
(74) *Attorney, Agent, or Firm* — Willink & Hunt LLP; Marcus T. Hunt

(57) ABSTRACT

In some aspects, devices, systems, and methods are provided that relate to data deduplication performed in data storage devices, such as solid-state drives (SSD) or drives of any other type. In some aspects, devices, systems, and methods are provided that relate to hierarchical data deduplication at a local and system level, such as in a storage system built with one or more SSDs having built-in data deduplication functionality. The hierarchical data deduplication utilizes the IDs in the data storage devices to decide if the incoming data has to be stored or if a copy of the incoming data is already stored. In hierarchical data deduplication, no IDs (or signatures) are required to be stored at a system level. In some aspects, data steering is provided that enables data storing coordination in a system that consists of a set of data storage device (e.g., SSDs) having built-in data deduplication.

23 Claims, 8 Drawing Sheets

DEVICES, SYSTEMS, AND METHODS FOR REDUCING STORAGE UTILIZATION WITH DATA DEDUPLICATION

CROSS-REFERENCE TO RELATED APPLICATIONS

This application claims benefit under 35 U.S.C. § 119(e) of U.S. Provisional Application No. 62/500,231, filed May 2, 2017, the entirety of which is incorporated herein by reference.

FIELD

The present disclosure is generally related to data storage, and more particularly, to data storage management and utilization.

BACKGROUND

With advances in non-volatile memory technology, a key parameter is the cost of memory. Efficient use of memory in a storage system can help increase the amount of usable storage, thus reducing the effective price per gigabyte of storage. Prior storage systems include a computer server having hardware and software to analyze the data prior to be stored in a storage media, and then to either store the data in the storage media or store a reference to the data in memory of the computer server. In these storage systems, the computer server is an integral part of the storage system, with the analysis performed at a system level on the computer server, and information, such as signatures and references to the data, saved at a system level on the computer server. The storage media in these storage systems, such as solid-state storage drives (or solid-state drives) (SSDs) or hard drive devices (or hard disk drives) (HDD), have no analytical capability or intelligence to enable such analysis.

SUMMARY

In some aspects of the present disclosure, a data storage device is provided that includes: a plurality of memory devices comprising memory; and a controller coupled to the plurality of memory devices. The controller includes logic to: receive first data to be stored in the plurality of memory devices; perform a first check to determine if a copy of the first data is already stored in the plurality of memory devices; determine that the copy of the first data is already stored in the plurality of memory devices; and store a pointer to the copy of the first data in the plurality of memory devices instead of storing the first data in the plurality of memory devices.

In some aspects of the present disclosure, a storage system is provided that includes: a plurality of interfaces configured to couple to a plurality of data storage devices; a processing component coupled to the plurality of interfaces to enable communication with the plurality of data storage devices when coupled to the plurality of interfaces; and, memory coupled to the processing component. The memory includes instructions, which when executed by the processing component, cause the processing component to: receive first data to be stored in the plurality of data storage devices; compute a first ID for the first data; initiate a first query for each of the plurality of data storage devices to locally search for the first ID; receive responses to the first query from each of the plurality of data storage devices; and, as a result of receiving the first response, store a pointer to a copy of the first data stored in the first data storage device instead of storing the first data in the plurality of memory devices. The copy of the first data is linked to the first ID in the first table of IDs. Each of the plurality of data storage devices maintains a table of IDs for data stored locally. A first response to the first query is received from a first data storage device of the plurality of data storage devices. The first response indicates that the first ID exists in a first table of IDs in the first data storage device In some aspects of the present disclosure, a method is provide that includes receiving, at a data storage device, first data to be stored in the plurality of memory devices; performing a first check to determine if a copy of the first data is already stored in the plurality of memory devices; determining that the copy of the first data is already stored in the plurality of memory devices; and storing a pointer to the copy of the first data in the plurality of memory devices instead of storing the first data in the plurality of memory devices.

In some aspects of the present disclosure, a method is provided that includes: receiving, at a storage system, first data to be stored in the plurality of data storage devices; computing a first ID for the first data; initiating a first query for each of the plurality of data storage devices to locally search for the first ID; receiving responses to the first query from each of the plurality of data storage devices; and as a result of receiving the first response, storing a pointer to a copy of the first data stored in the first data storage device instead of storing the first data in the plurality of memory devices. The copy of the first data is linked to the first ID in the first table of IDs. A first response to the first query is received from a first data storage device of the plurality of data storage devices. The first response indicates that the first ID exists in a first table of IDs in the first data storage device. Each of the plurality of data storage devices maintains a table of IDs for data stored locally.

BRIEF DESCRIPTION OF THE DRAWINGS

For a better understanding of at least an embodiment, reference will be made to the following Detailed Description, which is to be read in conjunction with the accompanying drawings, wherein.

DETAILED DESCRIPTION

Particular aspects of the present disclosure are described below with reference to the drawings. In the description, common features are designated by common reference numbers. Although certain examples are described herein with reference to a data storage system, it should be appreciated that techniques described herein are applicable to other implementations. Further, it is to be appreciated that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") may indicate "one or more" rather than "one." Further, an operation performed "based on" a condition or event may also be performed based on one or more conditions, or events not explicitly recited. As used herein, "exemplary" may indicate an example, an implementation, and/or an aspect, and should not be construed as limiting or as indicating a preference or a preferred example, implementation, and/or aspect.

One technique to increase the amount of usable storage, is to determine if the new data needs to be stored or not in storage (storage device or storage media). The determination of whether data needs to be stored or not can be based on whether a copy of the data is already stored (or present) in the storage device. For example, if a copy of the data is not already stored in the storage device, then the data is stored in the storage device. And, if a copy of the data is already stored in the storage device, then the data is not stored in the storage device to avoid a duplicate copy being stored. Such determination can be utilized to significantly improve the performance of the storage device. This technique is known as "data deduplication".

Data deduplication can include analyzing incoming data to determine if a copy of the incoming data is already stored in storage. If a copy of the incoming data is already stored, then instead of storing the incoming data, a pointer (or reference) to the copy of the incoming data is saved instead of the actual data. In this way, consumption of storage capacity is reduced. In some aspects of the present disclosure, devices, systems, and methods are provided that increase the effective available storage capacity in a storage device or system. Example areas of application can include, but are not limited to, the area of communications, networking, computing systems, etc.

Figure 1:
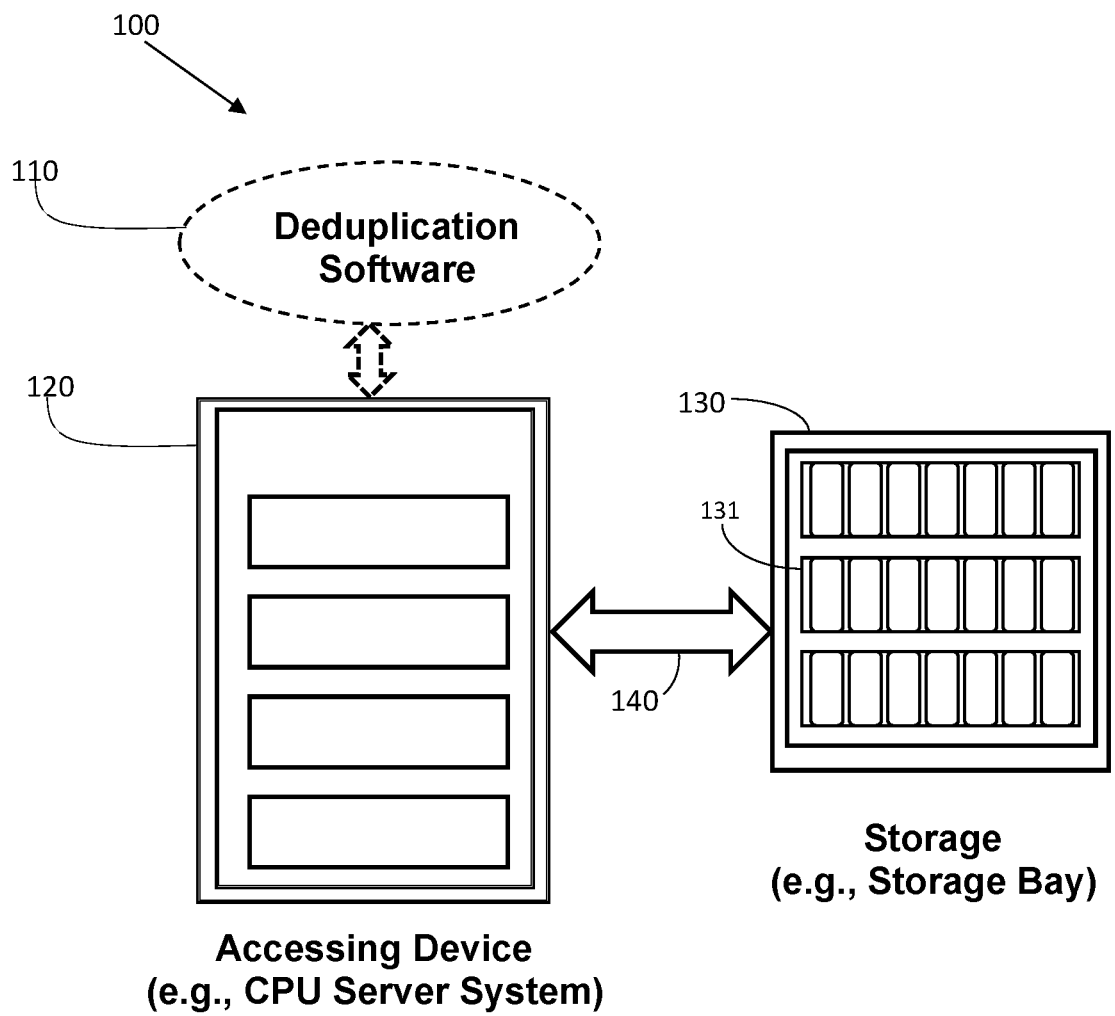
FIG. 1 illustrates a block diagram of an exemplary storage system, according to an embodiment.

FIG. 1 illustrates a block diagram of an exemplary storage system, according to an embodiment. In FIG. 1, a storage system 100 is shown including an accessing device 120 (described here as an exemplary CPU server system 120), storage 130 (described here as an exemplary data storage bay 130), and a connection (or interface) 140 between the storage 130 and the accessing device 120. While the storage system 100 of FIG. 1 is described with respect to the exemplary CPU server system 120 and the exemplary data storage bay 130, it should be appreciated that the description can also apply generally to other accessing devices 120 and storage 130.

The data storage bay 130 includes data storage device appliances 131, such as a set or combination of SSD or HDD appliances 131 that are mounted on a rack. The data storage device appliances 131 are shown including data storage devices 132, which can be SSDs or HDDs for example. The CPU server system 120 manages the data storage devices (and data storage device appliances 131) in the data storage bay 130. The data storage bay 130 of the storage system 100 of FIG. 1 can include interconnected data storage devices, such as interconnected SSDs, HDDs, or any other storage components or combination thereof.

In an embodiment, the CPU server system 120 can be running data deduplication software 110 (shown in dotted lines), such as in some current CPU server systems. By running the data deduplication software 110, the CPU server system 120 analyzes data prior to being stored in a data storage bay 130, and either stores the data in the data storage bay 130, or stores a reference to the data at a system level in dedicated memory on the CPU server system 120. The data deduplication performed by the CPU server system 120 of the storage system 100 in FIG. 1 can also generate IDs (or signatures) for incoming data and store the generated IDs in dedicated memory in the CPU server system 120 shown in FIG. 1.

In some aspects, devices, systems, and methods of data deduplication are provided at a storage system level within the storage 130. For example, either the storage 130 or the data storage device appliances 131, or both, can be storage systems including a processing component and memory, and have intelligent capabilities to provide data deduplication at a storage system level (as opposed to data deduplication at the CPU server system's system level, such as with the deduplication software 110 running on the CPU server system 120 in FIG. 1). The processor component can be any of a variety of processors, such as, one or more central processing units (CPUs), controllers, field-programmable gate arrays (FPGAs) or the like. The term "memory" is used here broadly to refer generally to the corresponding storage system level memory and can include multiple memories, such as one or more non-volatile memories, one or more volatile memories, or a combination thereof. The memory can include instructions for the processor to perform the data deduplication functionality at the corresponding storage system level.

The data deduplication at a storage system level can be performed off-line or in the background by software running on the storage 130 (e.g., on a storage compute server). With the data deduplication implemented in the storage 130 (e.g., the storage bay 130), data deduplication at a system level in the CPU server system 130 is not necessary. Therefore, in an embodiment, the CPU server system 130 does not implement the data deduplication software 110, and data deduplication is only implemented in the storage 130 at a storage system level. In another embodiment, the CPU server system 130 implements the data deduplication software 110, and the storage 130 implements its own data deduplication at the storage system level, such as by the devices, systems, and methods described herein.

Figure 2:
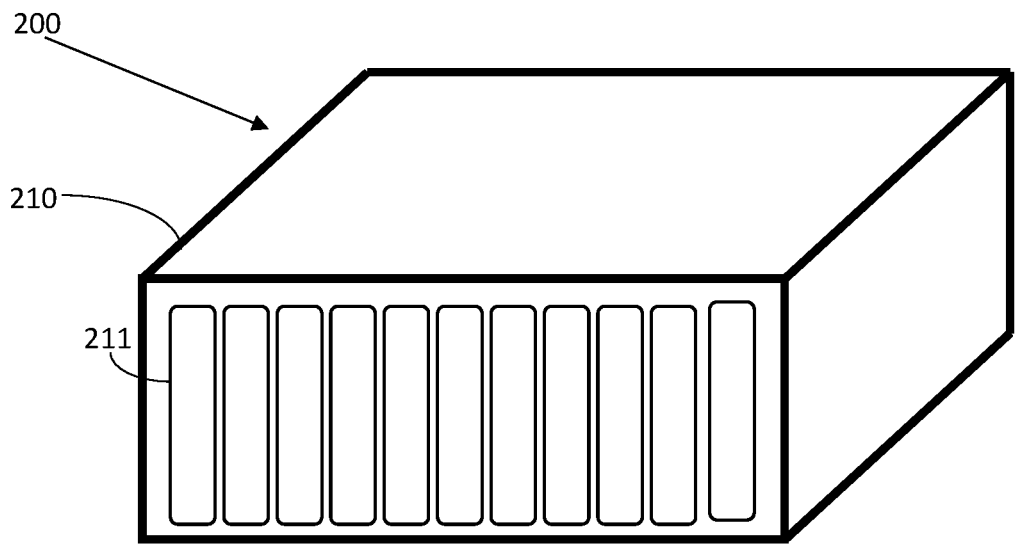
FIG. 2 illustrates a block diagram of an exemplary data storage device appliance shown in FIG. 1, according to an embodiment.

FIG. 2 illustrates a block diagram of an exemplary data storage device appliance shown in FIG. 1, according to an embodiment. A data storage device appliance 200 is shown in FIG. 2 including an enclosure 210 that contains storage drives 211. The storage drives, used in the appliance, can be SSDs, HDDs, or any other storage components. The storage device appliance 200 can, for example, provide switching capability to support Ethernet, Fiber Channel, Wireless interconnect capability, etc.

Figure 3:
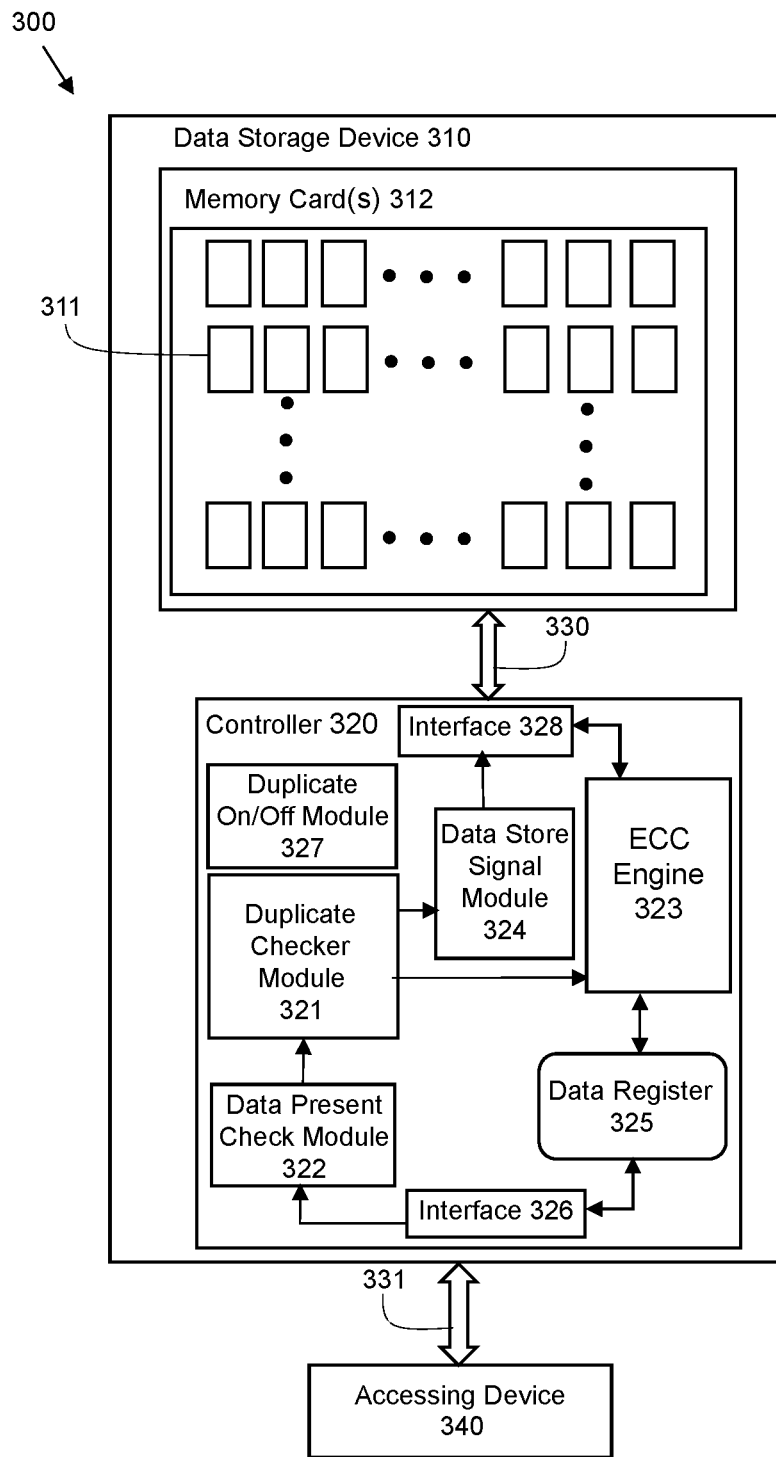
FIG. 3 illustrates a block diagram for an exemplary storage system comprising a data storage device and an accessing device, according to an embodiment.

FIG. 3 illustrates a block diagram for an exemplary storage system comprising a data storage device and an accessing device, according to an embodiment. In FIG. 3, a storage system 300 is shown including a data storage device 310 (e.g., an SSD) communicatively coupled to an accessing device (or host device) 340 via a connection (or communication path) 331, such as a bus or one or more wired or wireless connections. In an embodiment, the data storage device 310 can be implemented as the data storage device 211 shown in FIG. 2.

The data storage device 310 includes one or more memory cards (or memory device cards) 312 with memory devices 311. The memory cards 312 can be built using 2D Flash, 3D Flash, ReRAM, MRAM, 3D-Xpoint devices, or any memory technology available. The memory cards 312 can be of a hybrid design using a combination of the 2D Flash, 3D Flash, ReRAM, MRAM, 3D-Xpoint devices, or any other technology.

The controller 320 provides management and control for programming data into the memory devices 311 on the memory cards 312 via an interconnection 330 to the memory cards 312. The interconnection 330 can be a bus, for example, that is connected to the interface 328 of the controller 320. The controller 320 is shown including a data register 325 coupled to an interface 326 and an ECC engine (or ECC engine module) 323, which is coupled to an interface 328. Incoming data from the accessing device 340 that is intended to be stored in the data storage device 310 can be received via the interface 326 and connection 331.

The ECC engine 323 can process (e.g., add error correction codes) the incoming before being sent to the memory cards 312 via interface 328 and interconnection 330. The ECC engine 323 can also process (e.g., check for errors, remove error correction codes, etc.) when data is read from the memory cards 312 and sent to the accessing device 340. The ECC engine 323 can include an encoder configured to encode data words using an ECC encoding technique. For example, the ECC engine 323 can include a Reed-Solomon encoder, a Bose-Chaudhuri-Hocquenghem (BCH) encoder, a low-density parity check (LDPC) encoder, a turbo encoder, an encoder configured to encode the data according to one or more other ECC techniques, or a combination thereof, as illustrative, non-limiting examples.

The controller 320 shown in FIG. 3 also includes a data present check module 322 coupled to the interface 326 and a duplicate checker module 321, which is coupled to a data store signal module 324 and the ECC engine 323. The data present check module 322, the duplicate checker module 321, and the data store signal module 324 provide data deduplication at a local level in the data storage device 310. The data present check module 322 is a temporary repository for incoming data that is received from the accessing device 340 and intended to be stored in the data storage device 310. The duplicate checker module 321 determines (or checks) whether a copy of the incoming data in the data present check module 322 is already stored (or present) in the memory cards 312 of the data storage device 310. The duplicate checker module 321 informs the data store signal module 324 of its resulting determination as to whether a copy of the incoming data is already stored in the memory cards 312. Based on the resulting determination by the duplicate checker module 321, the data store signal module 324 generates programming commands to either store the incoming data in the memory cards 312 or not.

If the duplicate checker module 321 determines that a copy is not already stored in the memory cards 312, then the data store signal module 324 generates programming commands for the controller 320 to store the incoming data in the memory cards 312 (e.g., in one or more memory devices 311 on one of the memory cards 312). The duplicate checker module 321 sends a signal to the ECC engine 323 to process (e.g., add error correction codes) the incoming data for storage in the memory cards 312. In one embodiment, the duplicate checker module 321 sends the incoming data to the ECC engine 323 for processing. The data store signal module 324 generates the programming commands for the controller 320 to send the processed incoming data from the ECC engine 323 to the memory cards 312.

In one embodiment, if the duplicate checker module 321 determines that a copy is already stored in the memory cards 312, then the data store signal module 324 generates programming commands for the controller 320 to discard or ignore the incoming data. In another embodiment, the data store signal module 324 does not generate any programming commands and the incoming data is ignored. The controller 320 shown in FIG. 3 also includes a duplicate on/off module 327 that enables and disables data deduplication at the local level in the data storage device 310. The duplicate on/off module 327 is operably coupled to the duplicate checker module 321, data present check 322, and the data store signal 324 such that it can enable and disable their corresponding data deduplication functionalities. The duplicate on/off module 327 can be programmed by external commands (e.g., instructions or control signals) to enable or disable data deduplication. In an alternative embodiment, the duplicate on/off module 327 is not implemented and local data deduplication stays enabled.

In some embodiments, the data storage device 310 can be embedded within the accessing device 340, such as in accordance with a Joint Electron Devices Engineering Council (JEDEC) Solid State Technology Association Universal Flash Storage (UFS) configuration. For example, the data storage device 310 can be configured to be coupled to the accessing device 340 as embedded memory, such as eMMC® (trademark of JEDEC Solid State Technology Association, Arlington, Va.) and eSD, as illustrative examples. To illustrate, the data storage device 310 can include (or correspond to) an eMMC (embedded MultiMedia Card) device or a solid-state device (SSD). As another example, the data storage device 310 can correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). Alternatively, the data storage device 310 can be removable from the accessing device 340 (i.e., "removably" coupled to the accessing device 340). As an example, the data storage device 310 can be coupled to the accessing device 340 in accordance with a removable universal serial bus (USB) configuration or any other protocol such as PCIE, or SATA, SAS.

In some embodiments, the data storage device 310 can include (or correspond to) a solid-state drive (SSD), which can be included in, or distinct from (and accessible to), the accessing device 340. For example, the data storage device 310 can include or correspond to an SSD, which can be used as an embedded storage drive (e.g., a mobile embedded storage drive), an Enterprise Storage Drive (ESD), a client storage device, or a cloud storage drive, as illustrative, non-limiting examples. In some embodiments, the data storage device 310 is coupled to the accessing device 340 indirectly, e.g., via a network. For example, the network can include a data center storage system network, an enterprise storage system network, a storage area network, a cloud storage network, a local area network (LAN), a wide area network (WAN), the Internet, and/or another network. In some embodiments, the data storage device 310 can be a network-attached storage (NAS) device or a component (e.g., a solid-state drive (SSD) device) of a data center storage system, an enterprise storage system, or a storage area network. Storage systems can include, for example, any PCIe based SSDs, M.2 form factor, U.2 form factor, SATA, SAS, DIMM form factor, or packaged die products.

The accessing device 340 can include a processor and a memory (not shown in FIG. 3). The memory can be configured to store data and/or instructions that can be executable by the processor. The memory can be a single memory or can include multiple memories, such as one or more non-volatile memories, one or more volatile memories, or a combination thereof. The accessing device 340 can issue one or more commands to the data storage device 310 of FIG. 3, such as one or more requests to erase data, read data from, or write data to the memory devices 311 of the data storage device 310. The accessing device 340 can include a mobile telephone, a computer (e.g., a laptop, a tablet, or a notebook computer), a music player, a video player, a gaming device or console, an electronic book reader, a personal digital assistant (PDA), a portable navigation device, a computer, such as a laptop computer or notebook computer, a network computer, a server, any other electronic device, or any combination thereof, as illustrative, non-limiting examples.

Each of the memory devices 311 of the data storage device 310 in FIG. 3 can include one or more memory dies (e.g., one memory die, two memory dies, eight memory dies, or another number of memory dies). The memory devices 311 can include a memory, such as a non-volatile memory of storage elements included in a memory die of the memory devices 311. For example, the memory can include a flash memory, such as a NAND flash memory, or a resistive memory, such as a resistive random access memory (ReRAM), as illustrative, non-limiting examples. In some embodiments, the memory can have a three-dimensional (3D) memory configuration. As an example, the memory can have a 3D vertical bit line (VBL) configuration. In some embodiments, the memory is a non-volatile memory having a 3D memory configuration that is monolithically formed in one or more physical levels of arrays of memory cells having an active area disposed above a silicon substrate. Alternatively, the memory can have another configuration, such as a two-dimensional (2D) memory configuration, a monolithic 3-D memory, or a non-monolithic 3D memory configuration (e.g., a stacked die 3D memory configuration).

Figure 4:
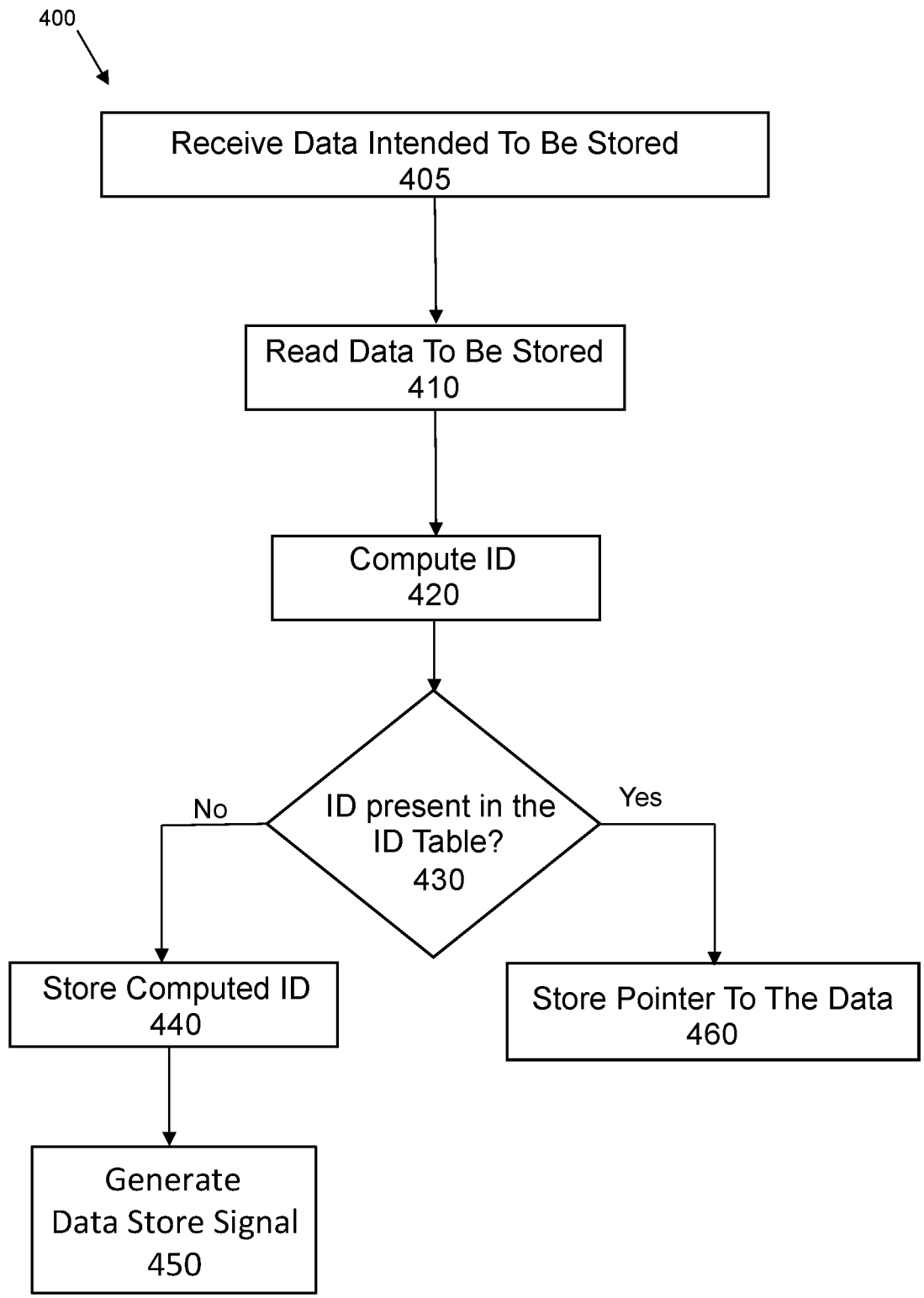
FIG. 4 illustrates a flow chart for an exemplary method of data deduplication at a local level in a data storage device, according to an embodiment.

FIG. 4 illustrates a flow chart for an exemplary method of data deduplication at a local level in a data storage device, according to an embodiment. The method 400 is an illustrative and exemplary method to determine if duplicate data exists in a data storage device. It should be appreciated that variations can be implemented in other embodiments without compromising the underlying principles of the present disclosure. In an embodiment, the method 400 is performed by the data storage device 310 shown in FIG. 3.

At block 405 of method 400, data intended to be stored is received at a data storage device. As an example using the embodiment shown in FIG. 3, the data storage device 310 receives incoming data (e.g., from the accessing device 340) along with instructions to store the incoming data. The incoming data is sent to the data present check module 322, which receives and holds the incoming data for the duplicate checker module 321.

At blocks 410 and 420, the data is read and then an ID (or signature) is computed for the data, respectively. The ID that is computed (or generated) is a unique ID for the specific data that is read. In this way, different data will each have their own unique ID. Furthermore, every time an ID is computed for the same specific data, the same unique ID is computed. In the example using the embodiment shown in FIG. 3, the duplicate checker module 321 reads and computes an ID for the incoming data that is received (e.g., from the host accessing device 340) and held in the data present check module 322.

At block 430, a determination is made as to whether the ID computed at block 420 already exists in a table of IDs for data (e.g., data blocks) already stored in the data storage device. The table of IDs can be maintained by the data storage device and link IDs with data already stored locally in the data storage device. For example, when an ID is computed for the incoming data, a query can be performed on the table of IDs to determine if the computed ID already exists. If the computed ID already exists in the table of IDs, then it can be determined that the incoming data associated with the computed ID is already stored in the data storage device. If the computed ID does not already exist in the table of all IDs, then it is determined that the incoming data associated with the computed ID is not already stored in the data storage device.

In the example using the embodiment shown in FIG. 3, the duplicate checker module 321 determines whether the ID computed at block 420 is already stored in the table of IDs. For example, the table of IDs can be maintained in memory on the memory cards 312, or in memory on the controller 320. The duplicate checker module 321 accesses the table of IDs and searches the table for the ID computed at block 420. If the computed ID already exists in the table, then it is determined that a copy of the data is already stored in the data storage device 310. If the computed ID does not already exist in the table, then it is determined that a copy of the data is not already stored in the data storage device 310.

If at block 430 it is determined that the computed ID does not exist in the table of IDs, then at block 440, the computed ID is stored in the table of IDs and a data store signal is generated so the controller stores the data associated with the computed ID, as represented by block 450 of FIG. 4. In the example using the embodiment shown in FIG. 3, if the duplicate checker module 321 searches the table of IDs and determines that the computed ID does not exist in the table of IDs, then the duplicate checker module 321 stores the computed ID in the table of IDs. The duplicate checker module 321 sends a signal to the data store signal module 324 indicating that the incoming data is not already stored in the data storage device 310. In an embodiment, the duplicate checker module 321 also sends a signal to the ECC engine 323 to process (e.g., add error correction codes) the incoming data for storage in the memory cards 312. In one embodiment, the duplicate checker module 321 also sends the incoming data to the ECC engine 323 for processing. The data store signal module 324 then generates the data store signal (e.g., the programming command) for the controller 320 to send the incoming data processed by the ECC engine 323 to the memory cards 312 for storage.

If at block 430 it is determined that the computed ID already exists in the table of IDs, then instead of storing the incoming data in the data storage device, a pointer to the copy of the incoming data that is already stored, as represented at block 460. In the example using the embodiment shown in FIG. 3, if the duplicate checker module 321 searches the table of IDs and determines that the computed ID already exists in the table of IDs, then the duplicate checker module 321 stores a pointer to the copy of the incoming data that is already stored in the data storage device.

When the accessing device 340 requests data stored in the memory cards 312, the controller 320 issues a read command for the stored data. The stored data is sent from retrieved from the memory cards 312 to the controller 320 via the interconnection 330 and interface 328. The ECC engine 323 receives the data and removes any error correction codes. If the ECC engine 323 detects any errors in the data, then error correction can be performed by the ECC engine 323 before sending to the accessing device 340 via the data register 325, the interface 326, and the connection 331.

Figure 5:
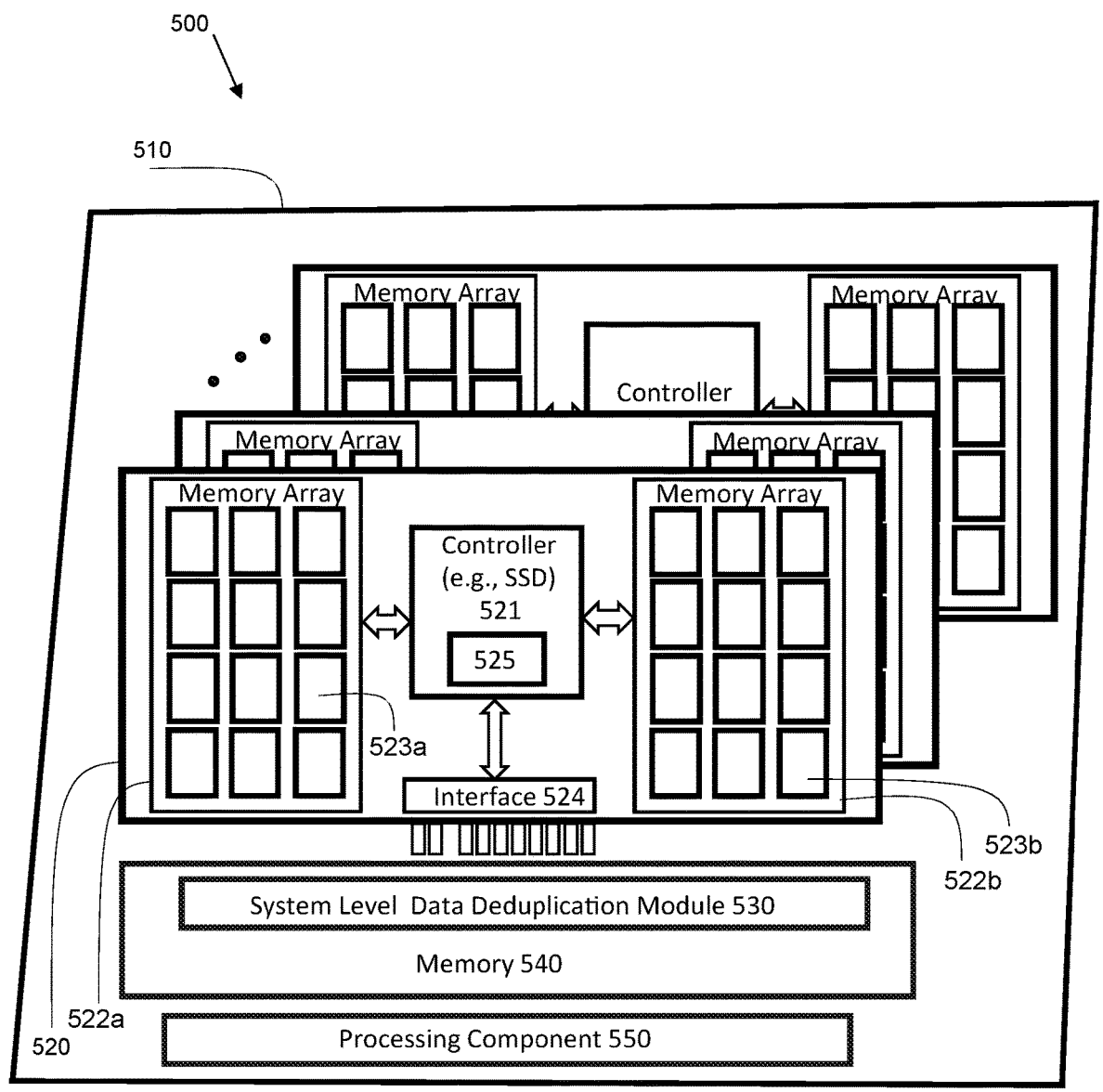
FIG. 5 illustrates a block diagram of an exemplary storage system including a plurality of data storage devices and configured for hierarchical data deduplication, according to an embodiment.
Figure 6:
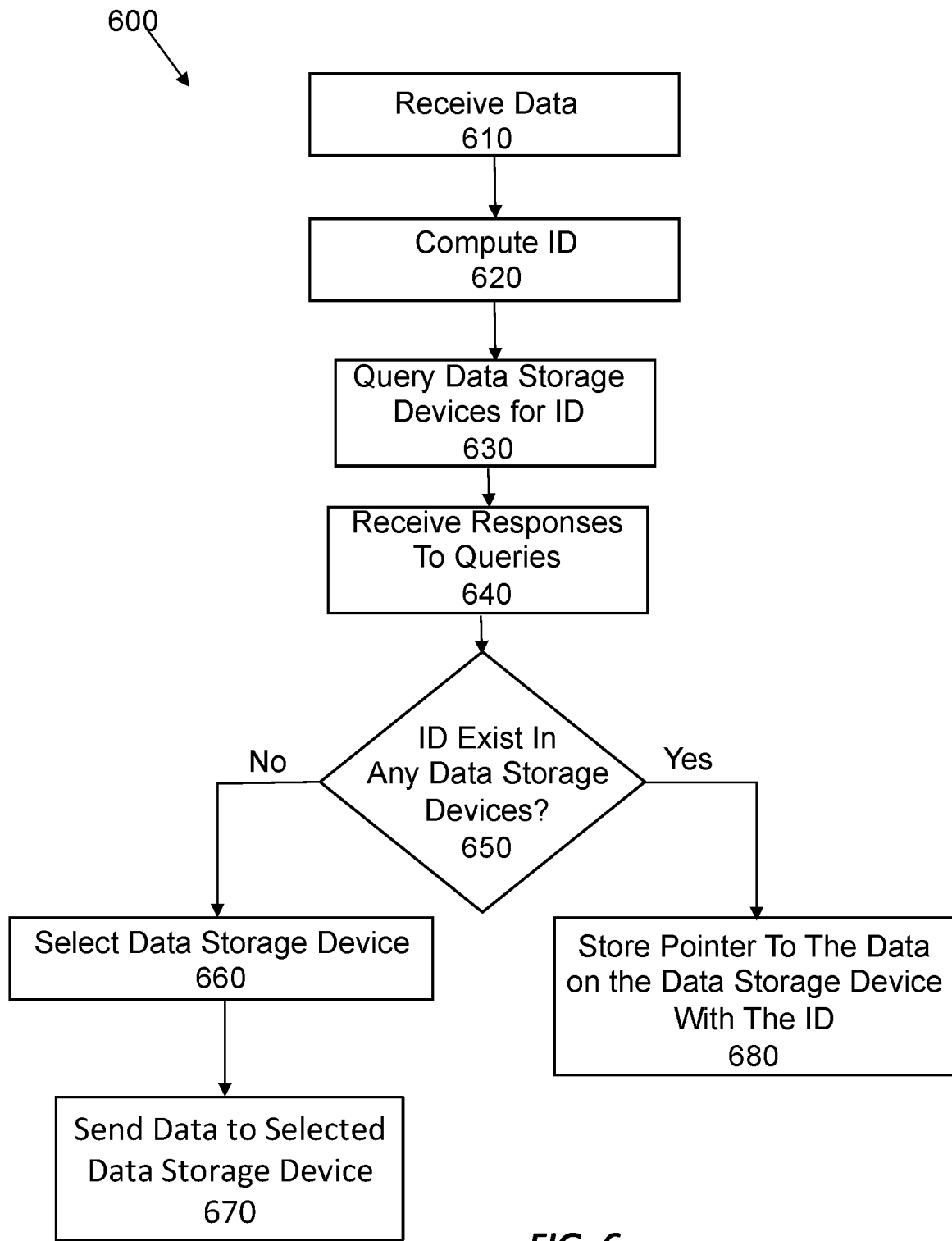
FIG. 6 illustrates a flow chart for an exemplary method of hierarchical data deduplication in a storage system, according to an embodiment.

The data storage device 310 in FIG. 3 (and the method 400 of FIG. 4) provide data deduplication at a local level in the data storage device 310. The computed IDs are stored locally in the data storage device 310. In some aspects of the present disclosure, multiple data storage devices 310 (e.g., multiple SSDs) can be used to build a storage system that is enabled to perform hierarchical data deduplication at both the local and system level in storage. The data storage devices 310 performs the data deduplication locally, which enables the hierarchical data deduplication at the storage system level in storage (or system level in storage) without the need to store the computed IDs for the stored data at the storage system level. FIGS. 5 and 6 describe exemplary systems and methods that provide such hierarchical data deduplication, enabling data steering at a storage system level as well as locally at a data storage level.

FIG. 5 illustrates a block diagram of an exemplary storage system including a plurality of data storage devices and configured for hierarchical data deduplication, according to an embodiment. A storage system 500 is shown in FIG. 5 including a system board 510, one or more data storage devices 520, a memory 540, a processor component 550, and a system level data deduplication module 530. A representative data storage device of the data storage devices 520 is shown including a controller 521 with local data deduplication functionality; memory cards 522a and 522b having an array of memory devices 523a and 523b, respectively; data deduplication related modules 525; and, an interface 524 that couples the data storage device to an interface (not shown) on the system board 510. The data deduplication related modules 525 can include, for example, the data present check module 322, the duplicate checker module 321, the data store signal module 324, and the duplicate on/off module 327 of FIG. 3. In an embodiment, the storage system 500 can be the data storage device appliance 200 shown in FIG. 2.

The memory is 540 is coupled to the processor component 550, which is operably and communicatively coupled to the data storage devices 520 via interfaces or connectors on the system board 510. The processor component 540 can be any of a variety of processors, such as, one or more central processing units (CPUs), controllers, field-programmable gate arrays (FPGAs) or the like. In one embodiment, the processor component 540 is implemented as one or more management controllers. In another embodiment, the processor component 540 is implemented as one or more processors. The memory, which includes instructions for performing the functionality of the system level data deduplication module 530, can be coupled to the processor in any variety of manners—e.g., via electrical signal lines, embedded or integrated within the processor, etc. It should also be appreciated that the term "memory" is used here broadly to refer generally to all the system level memory and can include multiple memories, such as one or more non-volatile memories, one or more volatile memories, or a combination thereof.

In an embodiment, one or more of the data storage devices 520 are the data storage device 310 shown in FIG. 3. For example, the controller 521 is representative of the controller 320 in FIG. 3; the memory cards 522a and 522b are representative of the memory cards 312 of FIG. 3; the memory devices 523a and 523b are representative of the memory devices 311 in FIG. 3; the data deduplication related modules 525 are representative of the data present check module 322, the duplicate checker module 321, the data store signal module 324, and the duplicate on/off module 327 in FIG. 3; and, the interface 524 is representative of the interface 326 of FIG. 3. It should be appreciated that the example shown in FIG. 5 is illustrative and non-limiting, and that other variations can be implemented in other embodiments without compromising the underlying principles of the present disclosure. For example, the data storage devices 520 can vary from one another—e.g., include a different number of memory cards, different number of memory devices, different type or configuration of memory devices, etc. The underlying principles are applicable to any number and types of data storage devices having local data deduplication functionality.

The system board (or storage system board) 510 includes the system level data deduplication module 530 that steers data across the data storage devices 520 connected to the system board 510. For example, in an embodiment, the data storage devices 520 can include a plurality of SSDs, HDDs, or combination thereof) that is connected as an array of drives coupled to the system board 510. In one embodiment, the storage system 500 can be implemented as a storage rack with the system board 510 as the backplane. For the sake of clarity and brevity, not all components of the storage system 500 are shown in the block diagram of FIG. 5. For instance, it should be appreciated that in some embodiments, the system board 510 can include an interface (not shown) that enables communication between the storage system 500 and an accessing device (not shown), such as communication between the system level data deduplication module 530 and the accessing device (e.g., the CPU servers system 120 shown in FIG. 1). The accessing device can issue one or more commands to the storage system 500, such as one or more requests to erase data, read data from, or write data to the data storage devices 520 in the storage system 500. Furthermore, although not shown, it should be appreciated that the system board 510 includes interfaces or connectors (not shown) for receiving and coupling to the data storage devices 520.

The system level data deduplication module 530 is coupled to each of the data storage devices 520 and communicates with each data storage device via an interface (e.g., the interface 524) on the data storage device. In an embodiment, the system level data deduplication module 530 can communicate with at least one of the data deduplication related modules 525 on each of the data storage devices 520. For example, using the embodiment shown in FIG. 3, the system level data deduplication module 530 can communicate with one or more of the following: the data present check module 322, the duplicate checker module 321, the data store signal module 324, and the duplicate on/off module 327 shown in FIG. 3.

The system level data deduplication module 530 can compute an ID for incoming data and query each of the data storage devices (and receive responses to the query) to determine if a copy of incoming data is already stored in any of the data storage devices 520. At the storage system level, the system level data deduplication module 530 determines whether the incoming data is to be stored in the data storage devices 520, or whether the incoming data already exists in one or more of the data storage devices 520 (e.g., one or more SSDs or HDDs). At a local level, each data storage device can determine if a copy of the incoming data is already stored locally and inform the system level data deduplication module 530 accordingly. Further details of the data deduplication process for the embodiment shown in FIG. 5 are provided in the exemplary method provided in FIG. 6.

FIG. 6 illustrates a flow chart for an exemplary method of hierarchical data deduplication in a storage system, according to an embodiment. In an embodiment, the method is implemented in the storage system 500 of FIG. 5. At block 610 of method 600, incoming data that is intended to be stored is received. For example, the system level data deduplication module 530 can receive incoming data from the accessing device 340 along with instructions to store the incoming data. At block 620, an ID is computed for the incoming data. For example, the ID can be computed as a unique ID by the system level data deduplication module 530 in the same or similar manner as in the data storage devices 520. In this way, the same unique ID is computed for the same data whether computed by the system level data deduplication module 530 or any of the data storage devices 520.

At block 630, the data storage devices 520 are queried for the computed ID. In an embodiment, each of the data storage devices 520 can maintain a table of IDs for the data stored locally on its own data storage device (e.g., as described for the table of IDs in the embodiments of FIGS. 3 and 4). The system level data deduplication module 530 queries each of the data storage devices 520 to perform its own search for the computed ID to determine if the computed ID exists in its local table of IDs for the data stored locally in the data storage device. In an embodiment, the data storage devices 520 are queried in parallel. Each of the data storage devices 520 receive the computed ID and determine if the computed ID already exists in its table of IDs for the data stored locally in its own data storage device. Each of the data storage devices 520 then sends its response (e.g., search results) back to the system level data deduplication module 530. In an embodiment, if the computed ID exists in one the data storage devices 520, then that data storage device can also send the system level data deduplication module 530 the address where the associated copy of the incoming data is stored in that data storage device, or a pointer to the address.

At block 640, the system level data deduplication module 530 receives the responses to the queries for each of the data storage devices 520. At block 650, a determination is made as to whether any of the responses indicate that the computed ID existed locally on a data storage device. If none of the data storage devices 520 indicate that the computed ID existed locally in its data storage device at block 650, then the system level data deduplication module 530 selects one of the data storage devices 520 to store the incoming data, as represented at block 660. At block 670, the system level data deduplication module 530 sends the incoming data to the selected data storage device for storage. The selected data storage device receives the incoming data and stores the incoming data locally, and also stores the associated computed ID in its table of IDs. The incoming data can be processed (e.g., error correction codes added) by the selected data storage device before being stored locally.

If any of the data storage devices 520 indicates that the computed ID existed locally in its data storage device at block 650, then the system level data deduplication module 530 stores a pointer to the address on the specific data storage device where the copy of the incoming data is stored, as represented at block 680. If the pointer is provided by the data storage device with its response that the computed ID exists, then the system level data deduplication module 530 stores the pointer provided by the data storage device.

The system level data deduplication module 530 does not store (or save) the computed ID for the incoming data at the storage system level (e.g., on the system board 510). In another embodiment, while not necessary, the computed ID can be saved by the system level data deduplication module 530 at a system level if desired. The system level data deduplication module 530 stores the pointers at a storage system level (e.g., on the system board 510) once a determination is made that the incoming data exists in one of the data storage devices 520 (e.g., a SSD or HDD). The computed ID is not required to be saved at a storage system level since the data storage device (e.g., SSD or HDD) performs the data deduplication check using the IDs previously computed on the system board 510 of FIG. 5. It should be appreciated that other types of drives other than SSDs and HDDs can be implemented in other embodiments.

It should be appreciated that in an embodiment, the system level data deduplication module 530 can be implemented in an accessing device, such as a CPU server system, to provide hierarchical data deduplication at a local level in the data storage devices and at a system level in the accessing device. For example, in another embodiment, the storage system 500 of FIG. 5 can instead be a CPU server system that is coupled to the data storage devices 520 and which also serves as the accessing device. In another embodiment, the accessing device 340 of FIG. 3 can be coupled to more than one data storage device 310 and include a system level data deduplication module. In these embodiments, the accessing device (e.g., CPU server system) can serve as the accessing device and also include a system level data deduplication module, which operates in a similar manner as described for the system level data deduplication module 530 of FIG. 5 and the method of FIG. 6, except that the operations described as occurring at the storage system level are instead occurring at the system level of the accessing device. In these embodiments, the data deduplication in the accessing device (e.g., CPU server system) differ from that in prior existing systems (e.g., as described previously with respect to FIG. 1) because in these configurations the accessing device includes the system level data deduplication module and operates in a hierarchical manner (e.g., as similarly described for FIGS. 5 and 6) in cooperation with the data storage devices and their data deduplication functionality.

Figure 7:
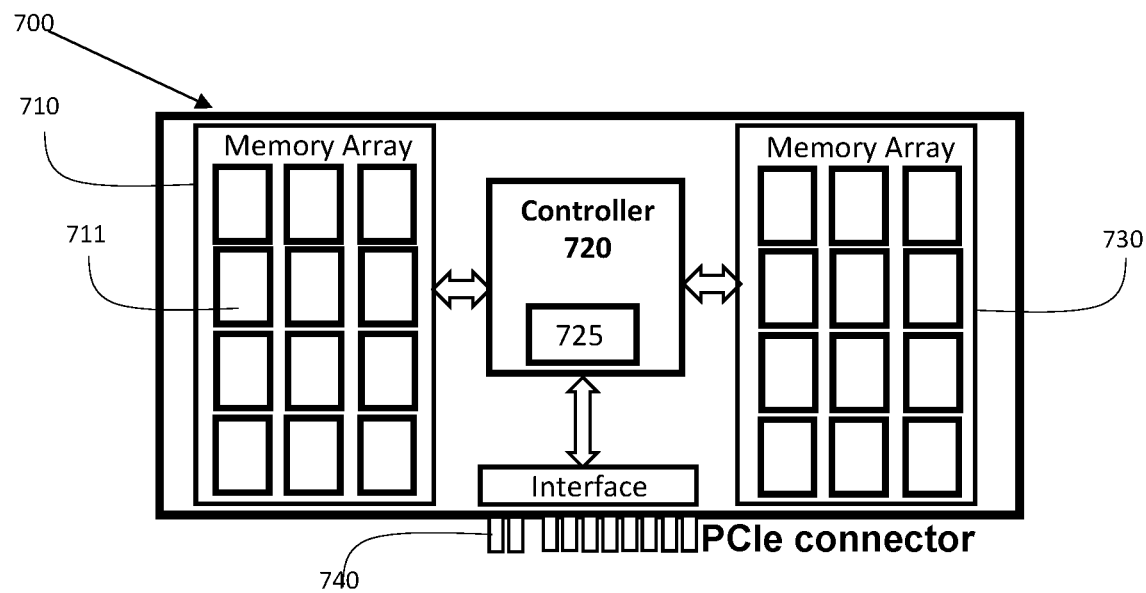
FIG. 7 illustrates a block diagram for an exemplary PCIe based data storage device 700, according to an embodiment.

FIG. 7 illustrates a block diagram for an exemplary PCIe based data storage device 700, according to an embodiment. The storage device 700 can be an SSD, HDD, or any other type of storage components. The storage device 700 shown in FIG. 7 is a SSD in a PCIe form factor, and thus can be referred to here as SSD 700. The SSD 700 in FIG. 7 includes memory arrays 710 and 730 (e.g., implemented on memory cards) of memory devices 711. The memory arrays can be built with 2D Flash, 3D Flash, ReRam, MRam, 3D Xpoint, magnetic platters, or any other non-volatile media. The memory arrays 710, 730 can include a hybrid of different non-volatile devices. A controller 720 in FIG. 7 manages the operation of the SSD 700, and includes data deduplication related modules 725. For example, in an embodiment, the PCIe based storage device 700 can be the data storage device 310 of FIG. 3, or the data storage device 520 of FIG. 5. For instance, the controller 720 can include the data present check module 322, the duplicate checker module 321, the data store signal module 324, and the duplicate on/off module 327 of FIG. 3 to perform data deduplication inside the SSD 700. The SSD 700 of FIG. 7, includes an interface 740, which is a PCIe interconnect.

Figure 8:
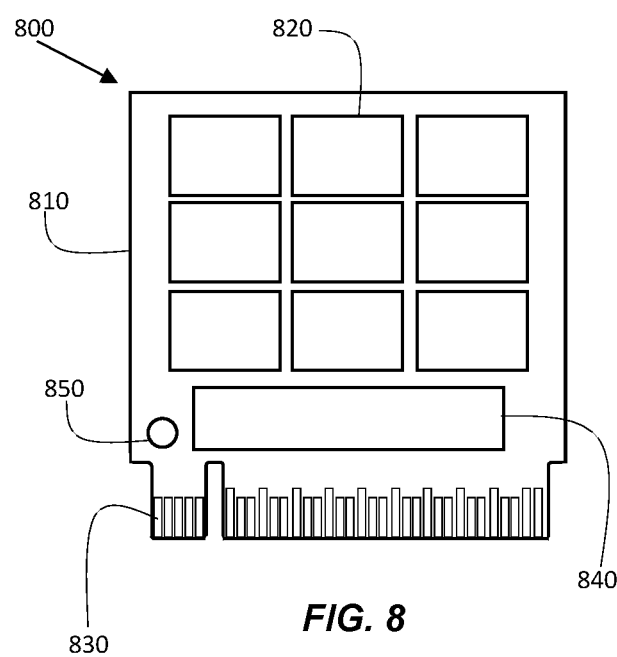
FIG. 8 illustrates a block diagram of an exemplary SSD implemented in a M.2 form factor and having built-in data deduplication, according to an embodiment.

FIG. 8 illustrates a block diagram of an exemplary SSD implemented in a M.2 form factor and having built-in data deduplication, according to an embodiment. In FIG. 8, an SSD 800 is shown including an M.2 drive 810, memory devices 820, a M.2 connector 830, and a controller 840. The controller 840 can include data deduplication related modules, such as the data present check module 322, the duplicate checker module 321, the data store signal module 324, and the duplicate on/off module 327 shown in FIG. 3 to perform data deduplication inside the SSD 800. The SSD can have a number of memory devices. The SSD 800 can also include discrete components (not shown). The SSD 800 can also include a hole 850 that is used to attach the SSD to a storage system. Other form factors can also be implemented in other embodiments. For example, in an embodiment, the SSD can also be implemented be in a U.2 form factor. In an embodiment, the SSD 800 can be implemented as the data storage device 310 of FIG. 3, or as one or more of the data storage devices 520 of FIG. 5.

Figure 9:
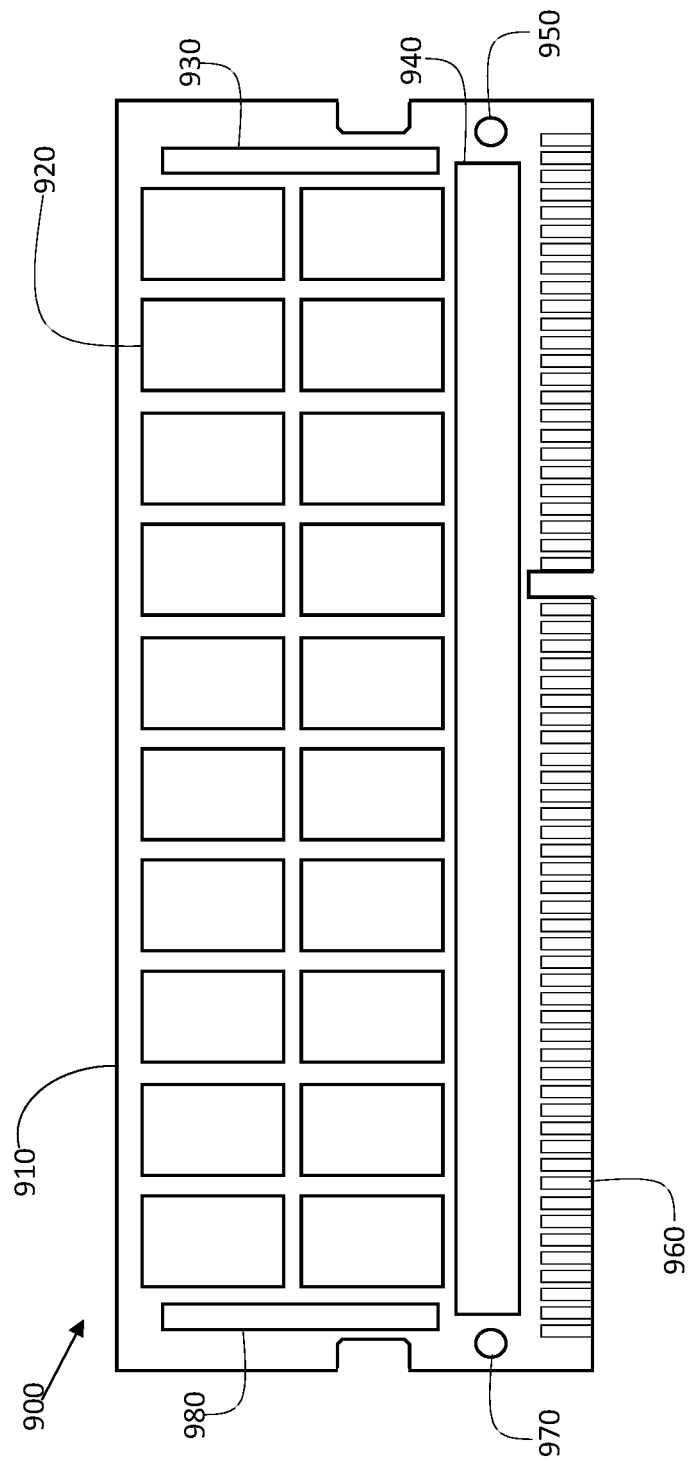
FIG. 9 illustrates a block diagram of an exemplary SSD implemented in a DIMM form factor and having built-in data deduplication, according to an embodiment.

FIG. 9 illustrates a block diagram of an exemplary SSD implemented in a DIMM form factor and having built-in data deduplication, according to an embodiment. In FIG. 9, an SSD 900 is shown including a DIMM drive 910, a memory device 920, various discrete components 930 and 980, a controller 940. The controller 940 can include data deduplication related modules, such as the data present check module 322, the duplicate checker module 321, the data store signal module 324, and the duplicate on/off module 327 shown in FIG. 3 to perform data deduplication inside the SSD 900. The SSD can have a number of memory devices. The SSD 900 can also include holes 950 and 970 that are used to attach the SSD 900 to a storage system. The SSD 900 can also include a DDR connector 960. In an embodiment, the SSD 900 can be implemented as the data storage device 310 of FIG. 3, or as one or more of the data storage devices 520 of FIG. 5.

It should be appreciated that the data storage devices described herein can be of a variety of types, form factors, packaging, etc., such as any PCIe based SSD, M.2 form factor, U.2 form factor, SATA, or SAS, DIMM form factor or packaged die products. This list is not to be construed as an exhaustive list.

Figure 10:
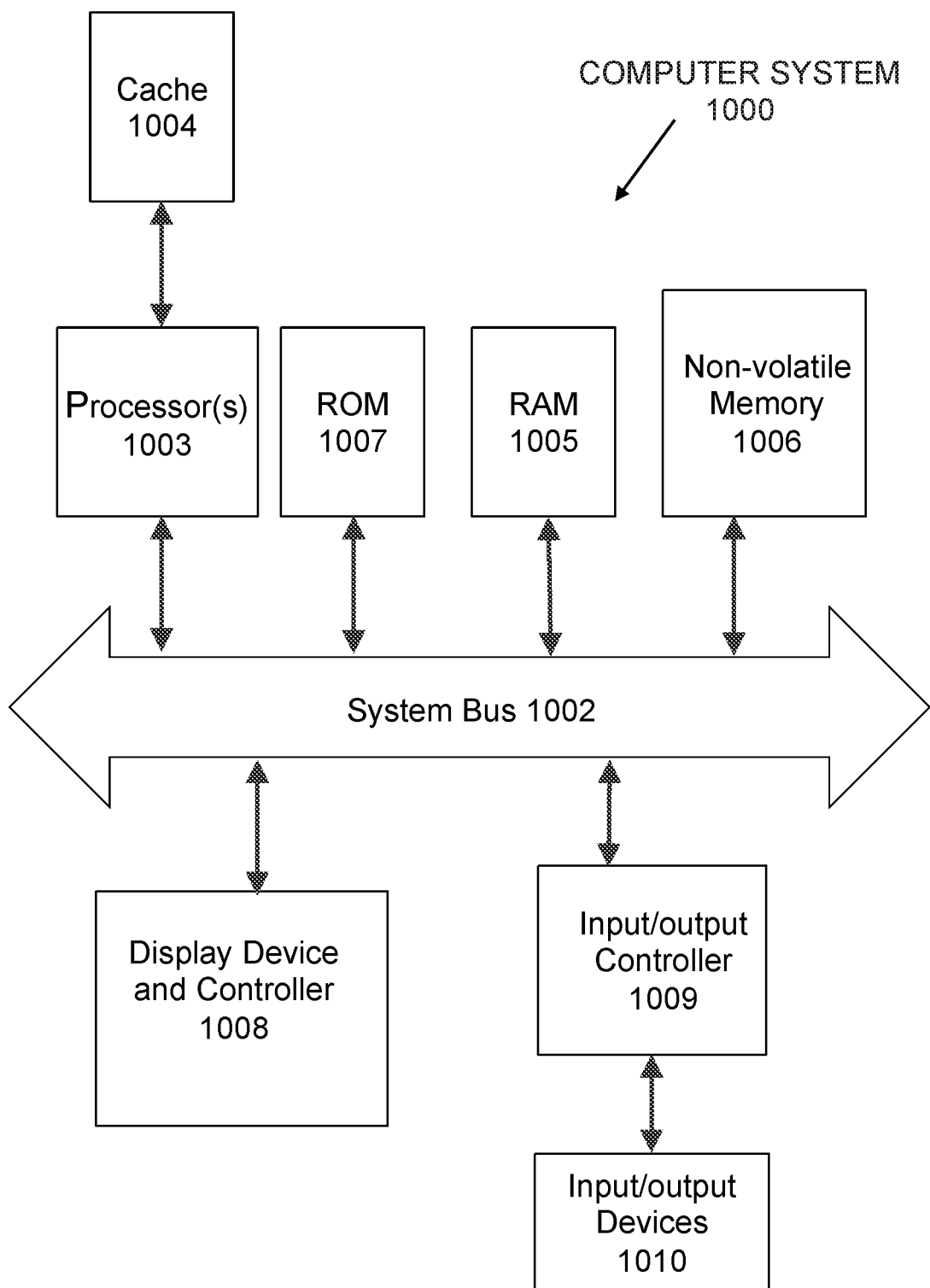
FIG. 10 illustrates a block diagram of an exemplary computer system (or data processing system), according to an embodiment.

FIG. 10 illustrates a block diagram of an exemplary computer system (or data processing system), according to an embodiment. Note that while FIG. 10 illustrates various components of a computer system, it is not intended to represent any particular architecture or manner of interconnecting the components. The computer system 1000 shown in FIG. 10 can represent an example accessing device (e.g., the CPU server system of FIG. 1 or the accessing device 340 shown in FIG. 3). It is also be appreciated that networked computers and other data processing systems which have fewer components, or perhaps more components, can also be implemented as the computer system.

As shown, the computer system 1000 includes a system bus 1002, which is coupled to a microprocessor 1003, a Read-Only Memory (ROM) 1007, a volatile Random Access Memory (RAM) 1005, as well as other nonvolatile memory 1006. In the illustrated embodiment, microprocessor 1003 is coupled to cache memory 1004. A system bus 1002 can be adapted to interconnect these various components together and also interconnect components 1003, 1007, 1005, and 1006 to other devices, such as a display controller and display device 1008, and to peripheral devices such as input/output ("I/O") devices 1010. Types of I/O devices can include keyboards, modems, network interfaces, printers, scanners, video cameras, or other devices well known in the art. Typically, I/O devices 1010 are coupled to the system bus 1002 through I/O controllers 1009. In one embodiment the I/O controller 1009 includes a Universal Serial Bus ("USB") adapter for controlling USB peripherals or other type of bus adapter.

RAM 1005 can be implemented as dynamic RAM ("DRAM"), which requires power continually in order to refresh or maintain the data in the memory. The other nonvolatile memory 1006 can include a magnetic hard drive, magnetic optical drive, optical drive, DVD RAM, solid-state storage drive, or other type of memory system that maintains data after power is removed from the system. While FIG. 10 shows that nonvolatile memory 1006 as a local device coupled with the rest of the components in the computer system 1000, it will be appreciated by skilled artisans that the described techniques can use a nonvolatile memory remote from the system, such as a network storage device coupled with the computer system through a network interface, such as a modem, Ethernet interface, or any other standard or proprietary interface.

EXAMPLE EMBODIMENTS

In some aspects of the present disclosure, a data storage device is provided that includes: a plurality of memory devices comprising memory; and a controller coupled to the plurality of memory devices. The controller includes logic to: receive first data to be stored in the plurality of memory devices; perform a first check to determine if a copy of the first data is already stored in the plurality of memory devices; determine that the copy of the first data is already stored in the plurality of memory devices; and store a pointer to the copy of the first data in the plurality of memory devices instead of storing the first data in the plurality of memory devices.

In an embodiment, the performing of the first check includes computing a first ID for the first data. The determining that the copy of the first data is already stored in the plurality of memory devices includes determining if the first ID exists in a table of IDs maintained by the controller. The table of IDs includes IDs for data stored in the plurality of memory devices.

In an embodiment, the controller further includes logic to: receive second data to be stored in the plurality of memory devices, the second data different than the first data; perform a second check to determine if a copy of the second data is already stored in the plurality of memory devices; determine that the copy of the second data is not already stored in the plurality of memory devices; and store the second data in the plurality of memory devices.

In an embodiment, the performing of the first check comprises computing a first ID for the first data. The determining that the copy of the first data is already stored in the plurality of memory devices includes determining if the first ID exists in a table of IDs maintained by the controller. The table of IDs comprising IDs for data stored in the plurality of memory devices. The performing of the second check includes computing a second ID for the second data; and the determining that the copy of the second data is not already stored in the plurality of memory devices includes determining if the second ID exists in the table of IDs maintained by the controller.

In an embodiment, the controller further includes logic to encode the second data according to one or more error-correcting code (ECC) techniques before storing the second data in the plurality of memory devices.

In an embodiment, the data storage device further includes: one or more memory cards coupled to the controller; and an interface to communicate with an accessing device. The first data and the second data are received from the accessing device. The one or more memory cards include the plurality of memory devices.

In an embodiment, the data storage device includes or corresponds to a solid-state drive (SSD).

In an embodiment, the controller further includes logic to disable and enable performing checks to determine if copies of received data are already stored in the plurality of memory devices.

In an embodiment, the controller further includes logic to: maintain a table of IDs for data stored locally on the data storage device; receive queries to determine if IDs exist locally on the data storage device; search for the queried IDs locally on the data storage device; and send responses to the queries indicating whether the queried IDs exist locally on the data storage device.

In some aspects of the present disclosure, a storage system is provided that includes: a plurality of interfaces configured to couple to a plurality of data storage devices; a processing component coupled to the plurality of interfaces to enable communication with the plurality of data storage devices when coupled to the plurality of interfaces; and, memory coupled to the processing component. The memory includes instructions, which when executed by the processing component, cause the processing component to: receive first data to be stored in the plurality of data storage devices; compute a first ID for the first data; initiate a first query for each of the plurality of data storage devices to locally search for the first ID; receive responses to the first query from each of the plurality of data storage devices; and, as a result of receiving the first response, store a pointer to a copy of the first data stored in the first data storage device instead of storing the first data in the plurality of memory devices. The copy of the first data is linked to the first ID in the first table of IDs. Each of the plurality of data storage devices maintains a table of IDs for data stored locally. A first response to the first query is received from a first data storage device of the plurality of data storage devices. The first response indicates that the first ID exists in a first table of IDs in the first data storage device In an embodiment, the instructions further cause the processing component to: receive second data to be stored in the plurality of data storage devices, the second data different than the first data; compute a second ID for the second data; initiate a second query for each of the plurality of data storage devices to locally search for the second ID; receive responses to the second query from each of the plurality of data storage devices; and as a result of receiving all of the responses to the second query indicating that the first ID does not exist locally, select one of the plurality of data storage devices to store the second data and send the second data to the selected data storage device for storage in the selected data storage device. All of the responses to the second query indicate that the first ID does not exist locally.

In an embodiment, the first response includes the pointer to the copy of the first data stored in the first data storage device.

In an embodiment, the instructions further cause the processing component to encode the second data according to one or more error-correcting code (ECC) techniques before storing the second data in the selected data storage device.

In an embodiment, the storage system further includes an accessing device coupled to the processing component. The accessing device is configured to issue commands to the processing component to read data from or write data to the plurality of data storage devices. The first data and the second data are received from the accessing device.

In an embodiment, the storage system further includes the plurality of data storage devices.

In an embodiment, each of the plurality of data storage devices includes: a plurality of memory devices; and a controller coupled to the plurality of memory devices. The controller includes logic to: maintain a table of IDs for data stored locally on the data storage device; receive queries to determine if IDs exist locally on the data storage device; search for the queried IDs locally on the data storage device; and send responses to the queries indicating whether the queried IDs exist locally on the data storage device.

In an embodiment, one or more of the plurality of the data storage devices includes or corresponds to a solid-state drive (SSD).

In an embodiment, the first query is initiated to each of the plurality of data storage devices in parallel.

In an embodiment, the first ID is stored locally in the first data storage device without being stored at a system level.

In an embodiment, the processing component is a management controller.

In some aspects of the present disclosure, a method is provide that includes receiving, at a data storage device, first data to be stored in the plurality of memory devices; performing a first check to determine if a copy of the first data is already stored in the plurality of memory devices; determining that the copy of the first data is already stored in the plurality of memory devices; and storing a pointer to the copy of the first data in the plurality of memory devices instead of storing the first data in the plurality of memory devices.

In an embodiment, the performing of the first check includes computing a first ID for the first data. The determining that the copy of the first data is already stored in the plurality of memory devices includes determining if the first ID exists in a table of IDs maintained by the controller. The table of IDs includes IDs for data stored in the plurality of memory devices.

In an embodiment, the method further includes: receiving second data to be stored in the plurality of memory devices; performing a second check to determine if a copy of the second data is already stored in the plurality of memory devices; determining that the copy of the second data is not already stored in the plurality of memory devices; and storing the second data in the plurality of memory devices. The second data is different than the first data.

In an embodiment, the performing of the first check includes computing a first ID for the first data. The determining that the copy of the first data is already stored in the plurality of memory devices includes determining if the first ID exists in a table of IDs maintained by the controller. The table of IDs includes IDs for data stored in the plurality of memory devices. The performing of the second check includes computing a second ID for the second data. The determining that the copy of the second data is not already stored in the plurality of memory devices includes determining if the second ID exists in the table of IDs maintained by the controller.

In an embodiment, the method further includes encoding the second data according to one or more error-correcting code (ECC) techniques before storing the second data in the plurality of memory devices.

In an embodiment, the data storage device includes: one or more memory cards coupled to the controller; and an interface to communicate with an accessing device. The first data and the second data are received from the accessing device. The one or more memory cards includes the plurality of memory devices.

In an embodiment, the data storage device includes or corresponds to a solid-state drive (SSD).

In an embodiment, the method further includes disabling and enabling performing checks to determine if copies of received data are already stored in the plurality of memory devices.

In an embodiment, the method further comprises: maintain a table of IDs for data stored locally on the data storage device; receive queries to determine if IDs exist locally on the data storage device; search for the queried IDs locally on the data storage device; and send responses to the queries indicating whether the queried IDs exist locally on the data storage device.

In some aspects of the present disclosure, a method is provided that includes: receiving, at a storage system, first data to be stored in the plurality of data storage devices; computing a first ID for the first data; initiating a first query for each of the plurality of data storage devices to locally search for the first ID; receiving responses to the first query from each of the plurality of data storage devices; and as a result of receiving the first response, storing a pointer to a copy of the first data stored in the first data storage device instead of storing the first data in the plurality of memory devices. The copy of the first data is linked to the first ID in the first table of IDs. A first response to the first query is received from a first data storage device of the plurality of data storage devices. The first response indicates that the first ID exists in a first table of IDs in the first data storage device. Each of the plurality of data storage devices maintains a table of IDs for data stored locally In an embodiment, the method further includes: receiving second data to be stored in the plurality of data storage devices, the second data different than the first data; computing a second ID for the second data; initiating a second query for each of the plurality of data storage devices to locally search for the second ID; receiving responses to the second query from each of the plurality of data storage devices; and as a result of receiving all of the responses to the second query indicating that the first ID does not exist locally, selecting one of the plurality of data storage devices to store the second data and send the second data to the selected data storage device for storage in the selected data storage device. All of the responses to the second query indicate that the first ID does not exist locally.

In an embodiment, the first response includes the pointer to the copy of the first data stored in the first data storage device.

In an embodiment, the method further includes encoding the second data according to one or more error-correcting code (ECC) techniques before storing the second data in the selected data storage device.

In an embodiment, the storage system includes an accessing device coupled to the processing component. The accessing device is configured to issue commands to the processing component to read data from or write data to the plurality of data storage devices, and wherein the first data and the second data are received from the accessing device.

In an embodiment, the storage system further includes the plurality of data storage devices.

In an embodiment, each of the plurality of data storage devices includes: a plurality of memory devices; and a controller coupled to the plurality of memory devices. The controller includes logic to: maintain a table of IDs for data stored locally on the data storage device; receive queries to determine if IDs exist locally on the data storage device; search for the queried IDs locally on the data storage device; and send responses to the queries indicating whether the queried IDs exist locally on the data storage device.

In an embodiment, one or more of the plurality of the data storage devices includes or corresponds to a solid-state drive (SSD).

In an embodiment, the first query is initiated to each of the plurality of data storage devices in parallel.

In an embodiment, the first ID is stored locally in the first data storage device without being stored at a system level.

In an embodiment, the processing component is a management controller.

Throughout the foregoing description, and for the purposes of explanation, numerous specific details are set forth in order to provide a thorough understanding of the described techniques. It will be apparent, however, to one skilled in the art that these techniques can be practiced without some of these specific details. Although various embodiments that incorporate these teachings have been shown and described in detail, those skilled in the art could readily devise many other varied embodiments or mechanisms to incorporate these techniques. Also, embodiments can include various operations as set forth above, fewer operations, or more operations; or operations in an order. Accordingly, the scope and spirit of the invention should only be judged in terms of any accompanying claims that may be appended, as well as any legal equivalents thereof.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics can be combined in any suitable manner in one or several embodiments. Although the present invention has been described above with reference to specific embodiments, it is not intended to be limited to the specific form set forth herein. Rather, embodiments other than those specific described above are equally possible within the scope of any accompanying claims. Moreover, it should be appreciated that the terms "comprise/comprises" or "include/includes", as used herein, do not exclude the presence of other elements or steps. Furthermore, although individual features can be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

For purposes of explanation, numerous specific details are set forth in order to provide a thorough understanding of the description. It should be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) can be variously combined, separated, removed, reordered, and replaced in a manner other than as expressly described and depicted herein. It should be appreciated that the block diagrams can include additional components that are not necessarily shown or described, but which have been left out for the sake of clarity and brevity.

Various components and modules described herein can include software, hardware, or a combination of software and hardware. The components and modules can be implemented as software modules, hardware modules, special-purpose hardware (e.g., application specific hardware, ASICs, DSPs, etc.), embedded controllers, hardwired circuitry, hardware logic, etc. Software content (e.g., data, instructions, and configuration) can be provided via an article of manufacture including a non-transitory, tangible computer or machine readable storage medium, which provides content that represents instructions that can be executed. The content may result in a computer performing various functions/operations described herein.

A computer or machine readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content can be directly executable ("object" or "executable" form), source code, or difference code ("delta" or "patch" code). A computer readable storage medium can also include a storage or database from which content can be downloaded. A computer readable medium can also include a device or product having content stored thereon at a time of sale or delivery. Thus, delivering a device with stored content, or offering content for download over a communication medium may be understood as providing an article of manufacture with such content described herein.

What is claimed is:

1. A storage system, comprising:
a plurality of interfaces configured to couple to a plurality of data storage devices wherein each of the plurality of data storage devices comprises:
a respective plurality of memory devices comprising memory; and
a respective controller coupled to the respective plurality of memory devices, the respective controller configured to write data to and read data from the respective plurality of memory devices;
a processing component coupled to the plurality of interfaces to enable communication with the plurality of data storage devices when coupled to the plurality of interfaces, the processing component configured to communicate with an accessing device; and
memory coupled to the processing component, the memory comprising instructions, which when executed by the processing component, cause the processing component to:
receive first data that the accessing device has requested to be written to the plurality of data storage devices;
compute a first ID for the first data;
initiate a first query for each of the plurality of data storage devices to search for the first ID locally in the respective data storage device, wherein each of the plurality of data storage devices maintains a respective table of IDs locally in the respective data storage device, and wherein the respective table of IDs comprises IDs linked to data that are stored locally in the respective data storage device;
receive a first response to the first query from a first data storage device of the plurality of data storage devices, wherein a copy of the first data is stored in the first data storage device, wherein the first response indicates that the first ID exists in a first table of IDs that is maintained locally in the first data storage device; and
as a result of receiving the first response, store a pointer to the copy of the first data instead of writing the first data to the plurality of data storage devices, wherein the copy of the first data is linked to the first ID existing in the first table of IDs.

2. The storage system of claim 1, wherein the instructions further cause the processing component to:
receive second data that the accessing device has requested to be written to the plurality of data storage devices, the second data different than the first data;
compute a second ID for the second data;
initiate a second query for each of the plurality of data storage devices to search for the second ID locally in the respective data storage device;
receive responses to the second query from each of the plurality of data storage devices, wherein a copy of the second data is not stored in the plurality of data storage devices, and wherein each of the responses to the second query indicates that the second ID does not exist in the respective table of IDs that is maintained locally in the respective data storage device; and
as a result of receiving all of the responses to the second query:
select one of the plurality of data storage devices to write the second data to; and
send the second data to the selected data storage device to be written to the selected data storage device.

3. The storage system of claim 2, wherein the first response comprises the pointer to the copy of the first data.

4. The storage system of claim 2, wherein the instructions further cause the processing component to encode the second data according to one or more error-correcting code (ECC) techniques before writing the second data to the selected data storage device.

5. The storage system of claim 2, further comprising the accessing device coupled to the processing component, wherein the accessing device is configured to issue commands to the processing component to read data from or write data to the plurality of data storage devices, and wherein the first data and the second data are received from the accessing device.

6. The storage system of claim 2, further comprising the plurality of data storage devices.

7. The storage system of claim 6, wherein the respective controller of each of the plurality of data storage devices comprises logic to:
  maintain the respective table of IDs locally in the respective data storage device;
  receive queries to determine if IDs exist locally on the respective data storage device;
  search for the queried IDs locally on the respective data storage device; and
  send responses to the queries indicating whether the queried IDs exist locally on the respective data storage device.

8. The storage system of claim 7, wherein one or more of the plurality of the data storage devices includes or corresponds to a solid-state drive (SSD).

9. The storage system of claim 1, wherein the first query is initiated to each of the plurality of data storage devices in parallel.

10. The storage system of claim 1, wherein the first ID is stored locally in the first data storage device without being stored at a system level.

11. The storage system of claim 1, wherein the processing component is a management controller.

12. The storage system of claim 2, wherein the first ID, the second ID, and the IDs in the respective table of IDs are uniquely computed such that data that are different have corresponding IDs that are different, and data that are the same have corresponding IDs that are the same.

13. A method comprising:
  receiving, at a storage system, first data that an accessing device has requested to be written to a plurality of data storage devices, wherein the storage system is configured to couple to the plurality of data storage devices, and wherein each of the plurality of data storage devices comprises:
    a respective plurality of memory devices comprising memory; and
    a respective controller coupled to the respective plurality of memory devices, the respective controller configured to write data to and read data from the respective plurality of memory devices;
  computing a first ID for the first data;
  initiating a first query for each of the plurality of data storage devices to search for the first ID locally in the respective data storage device, wherein each of the plurality of data storage devices maintains a respective table of IDs locally in the respective data storage device, and wherein the respective table of IDs comprises IDs linked to data that are stored locally in the respective data storage device;
  receiving a first response to the first query from a first data storage device of the plurality of data storage devices, wherein a copy of the first data is stored in the first data storage device, and wherein the first response indicates that the first ID exists in a first table of IDs that is maintained locally in the first data storage device; and
  as a result of receiving the first response, storing a pointer to the copy of the first data instead of writing the first data to the plurality of data storage devices, wherein the copy of the first data is linked to the first ID existing in the first table of IDs.

14. The method of claim 13, further comprising:
  receiving, at the storage system, second data that the accessing device has requested to be written to the plurality of data storage devices;
  computing a second ID for the second data;
  initiating a second query for each of the plurality of data storage devices to search for the second ID locally in the respective data storage device;
  receiving responses to the second query from each of the plurality of data storage devices, wherein a copy of the second data is not stored in the plurality of data storage devices, and wherein each of the responses to the second query indicates that the second ID does not exist in the respective table of IDs that is maintained locally in the respective data storage device; and
  as a result of receiving all of the responses to the second query:
    selecting one of the plurality of data storage devices to write the second data to; and
    sending the second data to the selected data storage device to be written to the selected data storage device.

15. The method of claim 14, wherein one or more of the plurality of the data storage devices includes or corresponds to a solid-state drive (SSD), wherein the first query is initiated to each of the plurality of data storage devices in parallel, and wherein the first ID is stored locally in the first data storage device.

16. A data storage device, comprising:
  a plurality of memory devices comprising memory;
  a controller coupled to the plurality of memory devices and configured to write data to and read data from the plurality of memory devices, the controller further configured to communicate with a processing component of a storage system; and
  an interface coupled to the controller and configured to couple to the storage system, the storage system comprising a processing component configured to communicate with:
    the data storage device via the interface,
    at least one additional data storage device; and
    an accessing device;
  wherein the controller comprises logic to:
    maintain a table of IDs locally in the data storage device, the table of IDs comprising IDs linked to data that are stored locally in the plurality of memory devices;
    receive, from the processing component, a first ID to search for in the table of IDs, wherein the first ID is computed, by the processing component, from first data that the accessing device has requested to be written to the storage system;
    search for the first ID in the table of IDs;
    determine that the first ID exists in the table of IDs, wherein a copy of the first data is stored in the plurality of memory devices, and wherein the copy of the first data is linked to the first ID existing in the table of IDs; and
    send, to the processing component, a first response to the first query, the first response indicating that the first ID exists in in the table of IDs.

17. The data storage device of claim 16, wherein the first response comprises a pointer to the copy of the first data.

18. The data storage device of claim 16, wherein the controller further comprises logic to:
  receive, from the processing component, a second ID to search for in the table of IDs, wherein the second ID is computed, by the processing component, from second data that the accessing device has requested to be written to the storage system;
  search for the second ID in the table of IDs;

determine that the second ID does not exist in the table of IDs, wherein a copy of the second data is not stored in the plurality of memory devices; and send, to the processing component, a second response to the second query, the second response indicating that the second ID does not exist in in the table of IDs.

19. The data storage device of claim 18, wherein each of the at least one additional data storage devices sends an additional response to the second query that indicates that that the second ID does not exist locally, and wherein the controller further comprises logic to, as a response to all of the at least one additional data storage devices sending the additional response to the processing component:

receive the second data from the processing component; and write the second data to the plurality of memory devices.

20. The data storage device of claim 18, wherein the first ID, the second ID, and the IDs in the respective table of IDs are uniquely computed such that data that are different have corresponding IDs that are different, and data that are the same have corresponding IDs that are the same.

21. A method comprising:

maintaining, by a controller, a table of IDs locally in a data storage device, wherein the data storage device comprises:

a plurality of memory devices comprising memory;

the controller coupled to the plurality of memory devices and configured to write data to and read data from the plurality of memory devices, the controller further configured to communicate with a processing component of a storage system; and an interface coupled to the controller and configured to couple to the storage system, the storage system comprising a processing component configured to communicate with:

the data storage device via the interface, at least one additional data storage device; and an accessing device;

wherein the table of IDs comprises IDs linked to data that are stored locally in the plurality of memory devices;

receiving, from the processing component, a first ID to search for in the table of IDs, wherein the first ID is computed, by the processing component, from first data that the accessing device has requested to be written to the storage system;

searching for the first ID in the table of IDs;

determining that the first ID exists in the table of IDs, wherein a copy of the first data is stored in the plurality of memory devices, and wherein the copy of the first data is linked to the first ID existing in the table of IDs; and sending, to the processing component, a first response to the first query, the first response indicating that the first ID exists in in the table of IDs.

22. The method of claim 21, further comprising:

receiving, from the processing component, a second ID to search for in the table of IDs, wherein the second ID is computed, by the processing component, from second data that the accessing device has requested to be written to the storage system;

searching for the second ID in the table of IDs;

determining that the second ID does not exist in the table of IDs, wherein a copy of the second data is not stored in the plurality of memory devices; and sending, to the processing component, a second response to the second query, the second response indicating that the second ID does not exist in in the table of IDs.

23. The method of claim 22, wherein each of the at least one additional data storage devices send an additional response to the second query that indicates that that the second ID does not exist locally, and wherein the method further comprises, as a response to all of the at least one additional data storage devices sending the additional response to the processing component:

receiving the second data from the processing component; and writing the second data to the plurality of memory devices.

* * * * *

UNITED STATES PATENT AND TRADEMARK OFFICE
CERTIFICATE OF CORRECTION

PATENT NO.         : 10,635,339 B2
APPLICATION NO.    : 15/969733
DATED              : April 28, 2020
INVENTOR(S)        : Manuel Antonio d'Abreu and Ashutosh Kumar Das It is certified that error appears in the above-identified patent and that said Letters Patent is hereby corrected as shown below:

On the Title Page

Left Column, Item (73), the Assignee name "SMART IPOS, INC." should correctly recite "SMART IOPS, INC."

Signed and Sealed this
Second Day of June, 2020

Andrei Iancu
*Director of the United States Patent and Trademark Office*